United States Patent [19]
Schweizer

[11] Patent Number: 5,658,230
[45] Date of Patent: Aug. 19, 1997

[54] DEVICE FOR PRODUCING A PROTECTIVE LAYER FOR TOILET SEATS

[75] Inventor: Paul Schweizer, Unterengstringen, Switzerland

[73] Assignee: Limark AG, Bern, Switzerland

[21] Appl. No.: 381,990

[22] PCT Filed: Jul. 13, 1994

[86] PCT No.: PCT/CH94/00148

§ 371 Date: Feb. 16, 1995

§ 102(e) Date: Feb. 16, 1995

[87] PCT Pub. No.: WO95/02503

PCT Pub. Date: Jan. 26, 1995

[30] Foreign Application Priority Data

Jul. 16, 1993 [CH] Switzerland ............... 2159/93

[51] Int. Cl.⁶ ............... B31B 1/20; B31B 1/24; B29C 53/30
[52] U.S. Cl. ............... 493/405; 493/418; 493/458; 493/960
[58] Field of Search ............... 493/405, 407, 493/446, 450, 451, 455, 458, 464, 960, 416, 417, 418, 422, 438, 439, 440, 475, 476

[56] References Cited

U.S. PATENT DOCUMENTS

| | | | |
|---|---|---|---|
| 2,347,086 | 4/1944 | Curtiss et al. | 18/19 |
| 2,709,950 | 6/1955 | Foster | 493/451 |
| 3,392,890 | 7/1968 | Cramer | 493/405 |
| 3,397,264 | 8/1968 | Martinek | 264/287 |
| 3,438,578 | 4/1969 | Peterson et al. | 239/33 |
| 3,669,586 | 6/1972 | Kramer | 425/109 |
| 3,685,400 | 8/1972 | Higa | 93/1.5 |
| 3,908,704 | 9/1975 | Clement et al. | 138/21 |
| 4,098,177 | 7/1978 | Olney | 493/464 |
| 4,165,779 | 8/1979 | Jacobs | 160/348 |
| 4,201,119 | 5/1980 | Wolf | 93/60 |
| 4,273,551 | 6/1981 | Kostner | 493/455 |
| 4,536,175 | 8/1985 | Arnold | 493/464 |
| 4,674,153 | 6/1987 | Nausedas | 17/49 |
| 4,887,321 | 12/1989 | Maclean | 4/243 |
| 5,098,367 | 3/1992 | Bullinger | 493/357 |
| 5,361,424 | 11/1994 | Grunenfelder | 4/245.1 |

FOREIGN PATENT DOCUMENTS

| | | |
|---|---|---|
| 214831 | 10/1909 | Germany . |
| 1197218 | 7/1965 | Germany . |
| 561544 | 5/1944 | United Kingdom . |
| 1125911 | 9/1968 | United Kingdom . |

*Primary Examiner*—Joseph J. Hail, III
*Assistant Examiner*—Christopher W. Day
*Attorney, Agent, or Firm*—Sughrue, Mion, Zinn, Macpeak & Seas

[57] ABSTRACT

For producing a protective layer made of a sheet, a device exhibits an oblong guide element (1) with an upper edge (2), by way of which a sheet (7) can be folded in its longitudinal direction. Clamping elements (15, 16), designed as sliders, are arranged on the side of the guide element (1); and the sheet (7), folded in its longitudinal direction, can be grasped on both sides of the guide element (1) with said clamping elements. To form folds in the sheet (7), the clamping elements (15, 16) can be slid in the longitudinal direction of the guide element (1).

10 Claims, 9 Drawing Sheets

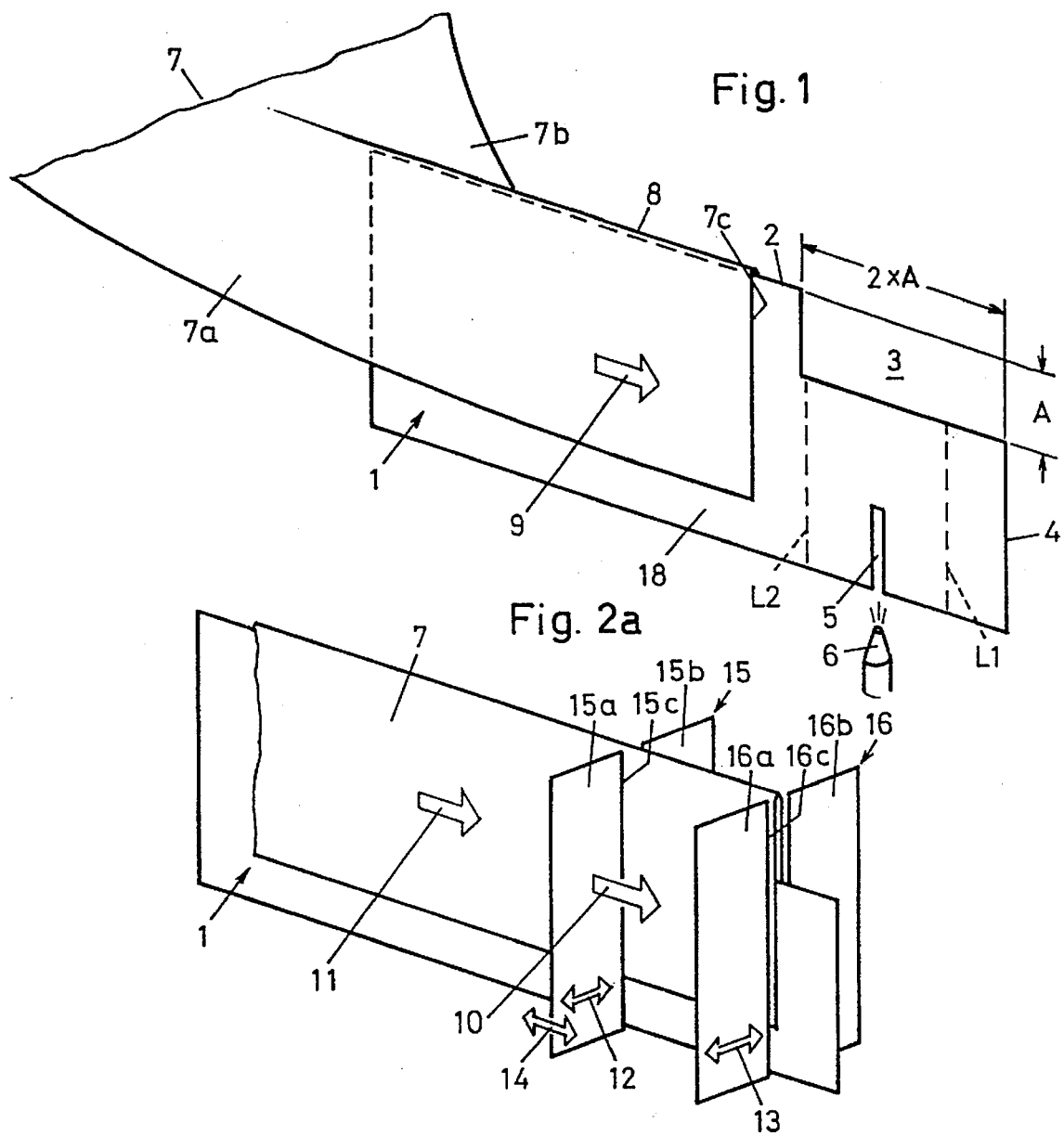
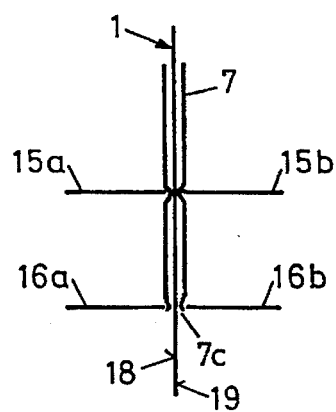
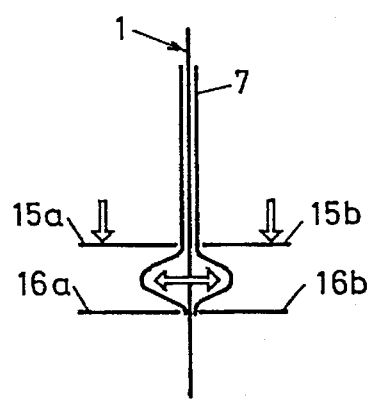

DEVICE FOR PRODUCING A PROTECTIVE LAYER FOR TOILET SEATS

The invention relates to a device for producing a protective layer for toilet seats. A protective layer for toilet seats has become known from the EP-B-0 331 631; said protective layer exhibits an oblong web, which is to be laid on the surface of a seat ring and is made of a thin and flexible sheet. The web of this protective layer is folded multiple times at right angles to its longitudinal direction and exhibits a leading edge, which is also folded at right angles to the longitudinal direction. If the ends of the folded web are grasped and pulled apart, the web unfolds and can be laid in a simple and reliable manner on a toilet seat. One special advantage of this protective layer is that it can be housed in comparatively little space.

The inventor has now set for himself the task of proposing a device with which a protective layer that is folded in this manner or in a similar manner can be produced; in particular a device in which the web is folded automatically.

The problem is solved in that the device exhibits an oblong guide element with at least one edge, by way of which a sheet is to be folded in its longitudinal direction; that clamping elements are arranged on the side of the guide element; and that the sheet can be grasped on both sides of the guide element with said clamping elements and can be slid in the longitudinal direction of the guide element or at right angles thereto in order to form a fold on each side of this guide element. The sheet can be slid in the longitudinal direction on the guide element and is grasped and slid by the clamping elements. The sheet can be folded over its entire length by means of repeated grasping and sliding operations by means of the clamping elements. It has been demonstrated that such a device can be realized with comparatively few, simple parts and still function very fast and reliably.

According to an improvement of the invention, there are two clamping elements that are spaced apart; a front-sided clamping element being moveable in relation to the guide element at right angles thereto and the other clamping element being moveable at right angles to the guide element and in the longitudinal direction of the guide element in the direction of the other clamping element. To form a fold, the sheet is affixed at the guide element with the one clamping element, whereas the other clamping element grasps and slides the sheet at a specific distance in relation to the front-sided clamping element. According to an improvement of the invention, a blowing device can be provided that conveys air against the open side of the sheet during a folding operation between the two clamping elements. The blowing device guarantees that the sheet between the two clamping elements folds outwardly. However, the blowing device can also be replaced, for example, by mechanically insertable fingers, wings or other suitable spreading elements.

The guide element exhibits preferably two parallel guide surfaces, against which the sheet rests and at which the sheet can be slid in the longitudinal direction of the guide element. According to an improvement of the invention, these two guide surfaces are spaced apart in such a manner that the folded sheet exhibits the shape of a U at right angles to the longitudinal direction.

According to an improvement of the invention, a clamping element is disposed in front of a front side of the guide element and another clamping element that can be moved against this front side is arranged at a distance from this front side. Even in this design the sheet is moved in the longitudinal direction step-by-step on the guide element. However, the cross section of the sheet is folded in the shape of a U via the guide element and is folded inwardly with the one clamping element, whereas the other clamping element moves simultaneously the region of the sheet to be folded against the guide element.

Other advantages and features of the invention follow from the dependent patent claims, the subsequent description and the drawings. Embodiments of the invention are explained in detail with reference to the drawings in the following.

FIG. 1 is a perspective view of a schematic drawing of a sheet deposited on a guide element.

FIG. 2a is a perspective view of a schematic drawing of a device according to the invention at the start of a first folding operation.

FIG. 2b is a top view of the device according to FIG. 2a.

FIG. 2c is a top view of the device according to FIG. 2b, showing the sheet during the formation of a first fold.

FIG. 3c is a top view of the device according to FIG. 3a.

FIG. 10b is a top view of the device according to FIG. 10a.

FIG. 11b is a top view of the device according to FIG. 11a.

FIG. 12b is a top view of the device according to FIG. 12a.

FIG. 14b is a view of the unfolded sheet according to FIG. 14a.

FIG. 15b is a view of an unfolded sheet according to FIG. 15a.

FIG. 16b is a view of an unfolded protective layer according to FIG. 16a.

Figure 3A:
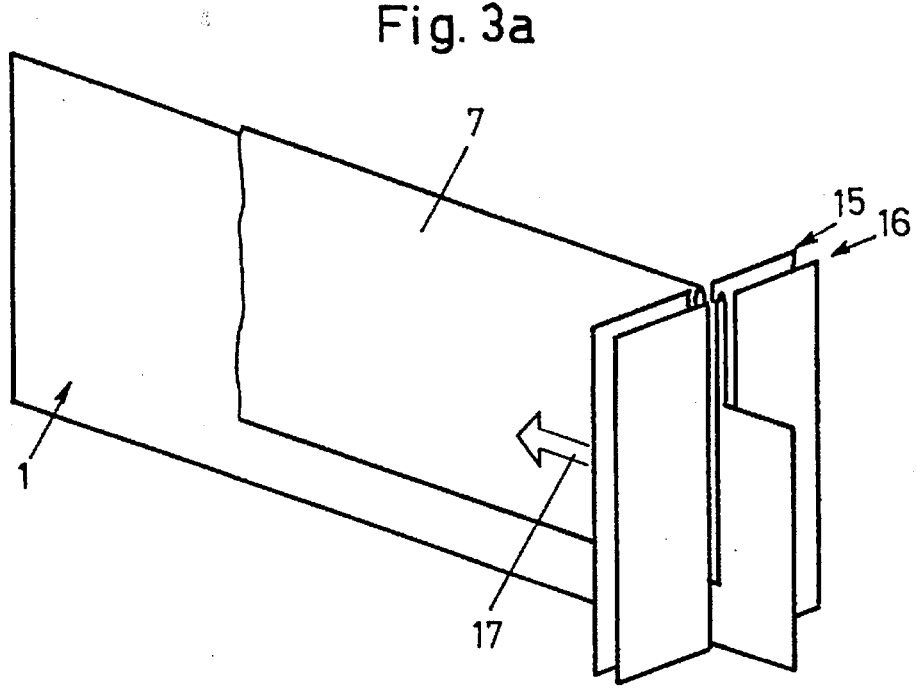
FIG. 3a is a perspective view of a schematic drawing of a device according to the invention following the production of a first fold.

FIG. 1 shows a sheet 7, which is made, for example of paper, plastic, material or a nonwoven textile. The sheet 7 is laid over a guide element 1 and folded in the center and in the longitudinal direction along an upper straight edge 2. The first fold 8 formed in the sheet 7 extends over the entire length of the sheet 7. The guide element 1 is, for example, a comparatively thin sheet metal, which is fastened on a machine frame (not shown here). The guide element 1 exhibits two parallel, planar guide surfaces 18 and 19, which are opposite each other; two recesses 3 and 5; and a front-sided edge 4.

Figure 3B:
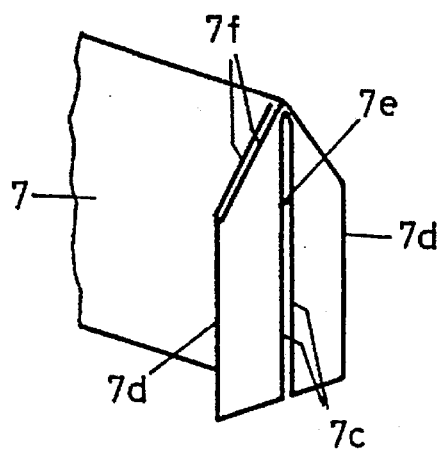
FIG. 3b is a perspective view of a schematic drawing of a part of a sheet provided with a first fold.
Figure 3C:
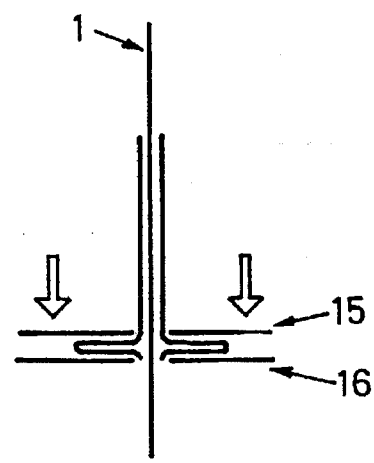
Figure 4A:
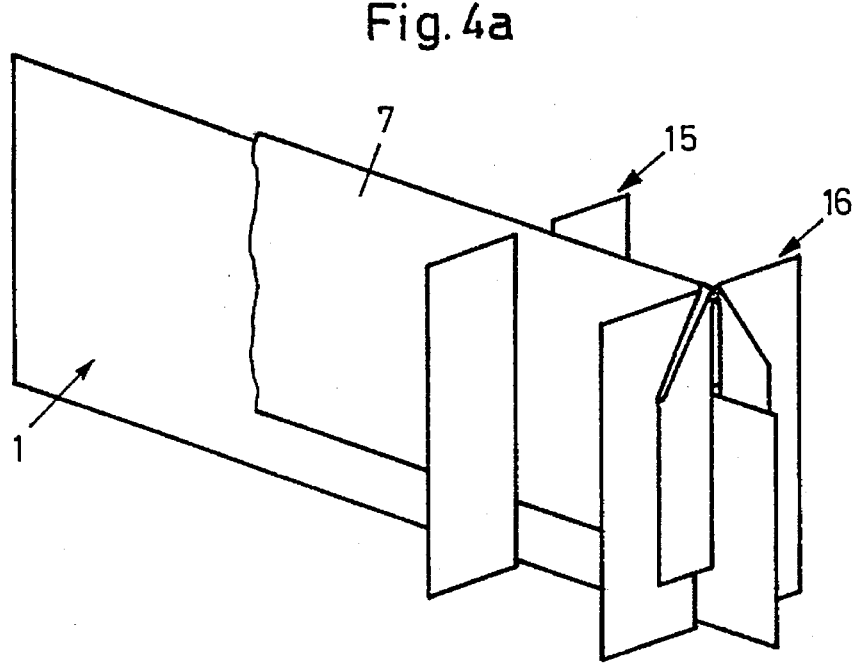
FIG. 4a is a perspective view of a schematic drawing of a device according to the invention at the start of the production of a second folding operation.
Figure 4B:
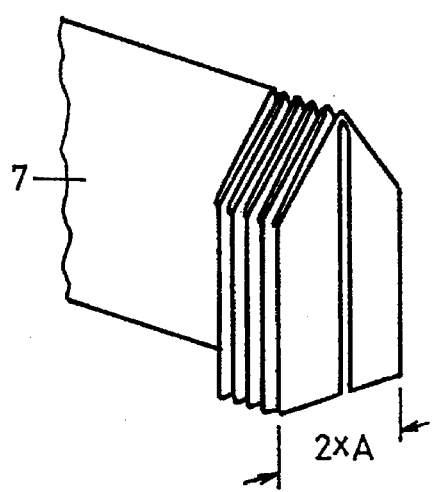
FIG. 4b is a perspective view of a part of a sheet folded multiple times.
Figure 4C:
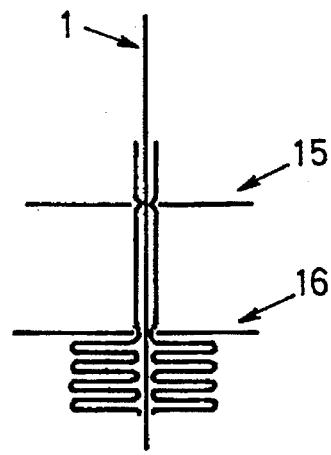
FIG. 4c is a top view of the device according to the invention, showing the sheet folded multiple times.
Figure 14A:
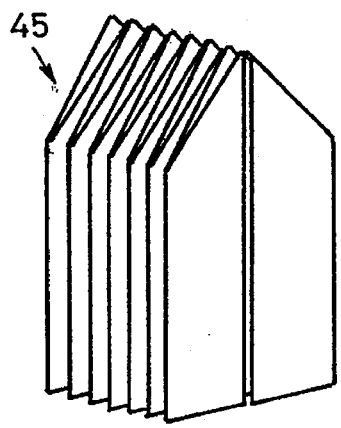
FIG. 14a is a perspective view of a protective layer produced with the device according to FIGS. 1 to 4.

As shown in FIGS. 2a and 2b, two clamping elements 15 and 16, which comprise two sliders 15a and 15b or 16a and 16b, are arranged laterally next to the guide element 1. These clamping elements 15 and 16 are arranged in the region of the recess 3 and extend vertically relative to the edge 2. The sliders 15a and 15b of the clamping element 15 can be moved at right angles to the guide surface 18 or 19 in accordance with the double arrow 12 and can be moved in the direction of the double arrow 14 in the direction of the clamping element 16 and away from it. The sliders 15a and 15b are provided with a motion element (not shown here) for the purpose of implementing these movements. This motion element can exhibit, for example, well-known pneumatic cylinders, which carry out the said movements. Such motion elements are well known in themselves and, therefore, do not have to be explained. In contrast, the sliders 16a and 16b can be moved only in the directions of the double arrow 13 with respect to the guide surface 18 or 19 at right angles to these surfaces. To provide the sheet 7 with fanfold folds, said sheet is slid onto the guide element 1 in the direction of the arrow 9 (FIG. 1) until said sheet assumes the position shown in FIGS. 2a and 2b. The sheet can be slid on with a gripper (not illustrated here) or by hand. As FIG. 2b shows in particular, a front edge 7c of the sheet 7 is arranged directly in front of the clamping element 16. To form a fold in the sheet simultaneously in both halves 7a and 7b, the sheet 7 is fixed in position with the front clamping element 16 along the line L1 (FIG. 1) by clamping to the guide element 1. Immediately thereafter, the sliders 15a and 15b are forced simultaneously against the sheet halves 7a or 7b and moved in the direction of the arrow 10 against the clamping element 16. Thus, the region of the sheet 7 that is between the clamping elements 15 and 16 is folded. The first folding is done as soon as the two clamping elements 15 and 16 are separated under pressure according to FIG. 3a. FIG. 3b depicts the resulting fold. One can see two parallel and vertical fold edges 7d, one horizontal fold edge 7e and four inclined fold edges 7f. The edges 7c also extend vertically and are opposite each other. So that the sheet 7 at the clamping element 15 moving in the direction of the arrow 10 moves in front of said clamping element 15, according to FIG. 2c, in the desired direction toward the outside, a nozzle 6 is arranged below the slotted recess 5; for reasons with regard to the drawing said nozzle is shown only in FIG. 1; and at the start of said movement of the clamping element 15 said nozzle directs a short blast of air into the recess 5. The air introduced into the recess 5 separates the sheet halves 7a and 7b at the bottom free edge in the region of the recess 5, thus introducing the subsequent formation of a fold. The nozzle 6 could also be replaced by fingers or similar spreading elements, which grasps from below between the sheet halves 7a and 7. As apparent, the edges 7d to 7f are formed by means of a single linear movement of the clamping element 15b. During this movement the region of the sheet 7 that is located behind the clamping element 15 is advanced in accordance with the arrow 11 (FIG. 2a). After the first fold is formed, the clamping element 15 is moved back again into the starting position shown in FIG. 2a in the direction of the arrow 17. FIG. 4a shows the device in a state following the completion of a first fold. The subsequent cycle for forming a second fold corresponds exactly to the aforementioned first cycle. The folding operations are repeated now until the sheet 7 is folded over its entire length. FIG. 14a depicts such a completely folded sheet, where in the case of a protective layer there are significantly more folds. If the ends of the folded sheet are grasped and pulled apart, said sheet unfolds into a sheet depicted in FIG. 14b.

Figure 5:
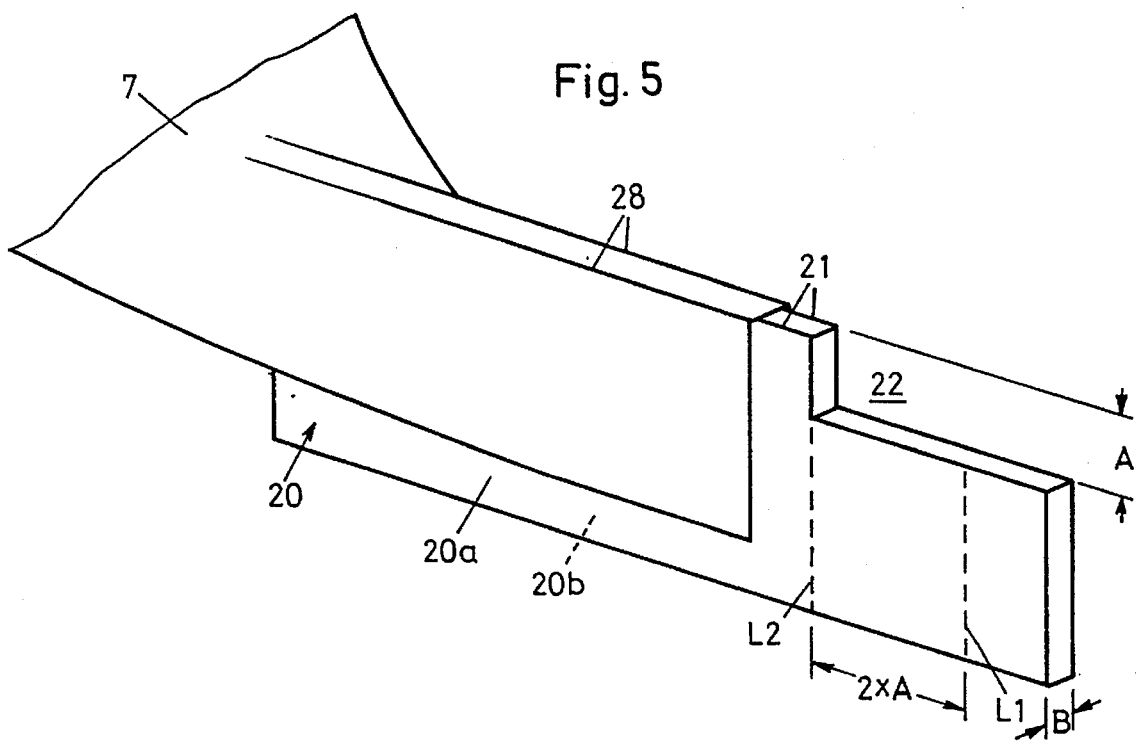
FIG. 5 is a perspective view of a schematic drawing of a sheet deposited on another guide element.
Figure 6:
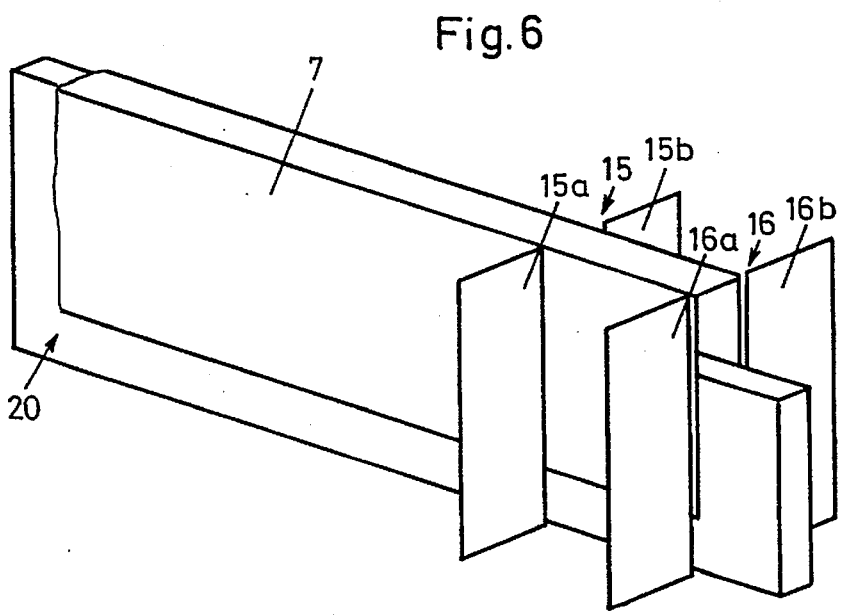
FIG. 6 is a perspective view of a schematic drawing of a variation of the device according to the invention.
Figure 7A:
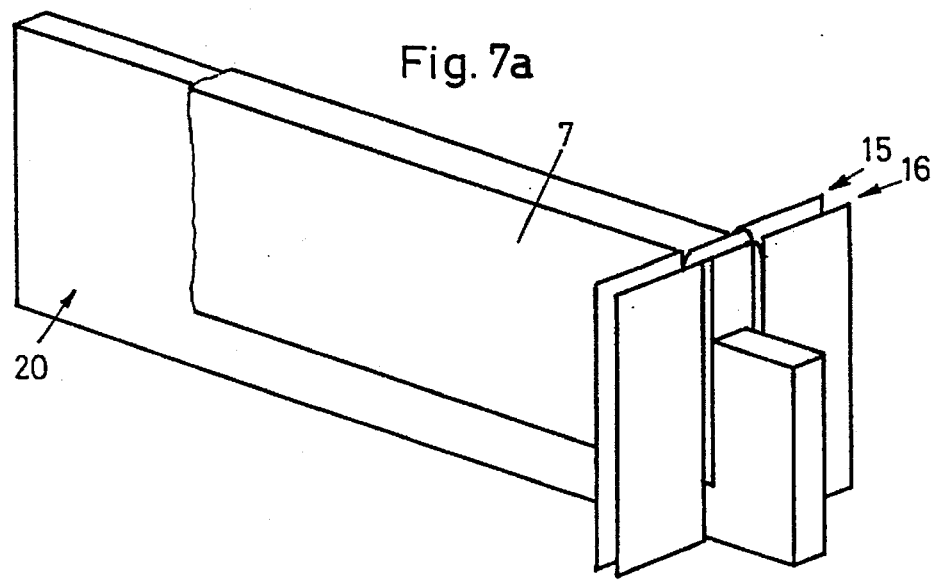
FIG. 7a depicts the device according to FIG. 6 following the production of a first fold.
Figure 8A:
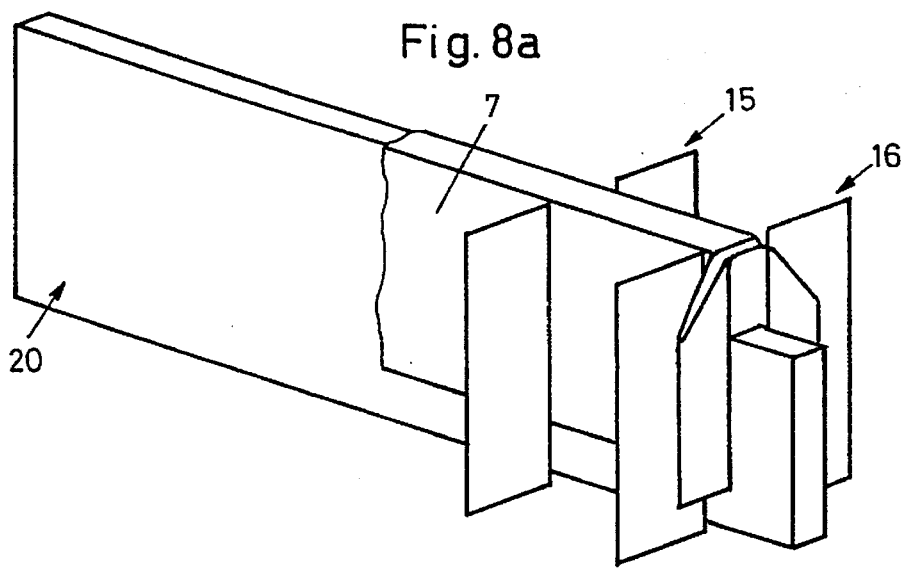
FIG. 8a depicts the device according to FIG. 6, immediately prior to formation of a second fold of a sheet.
Figure 7B:
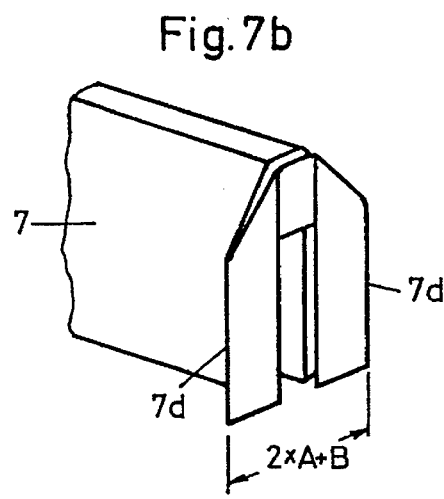
FIG. 7b is a perspective view of a section a sheet folded once.
Figure 8B:
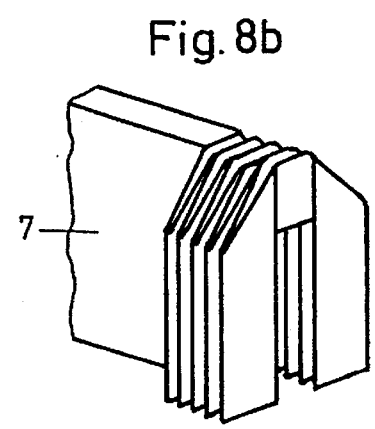
FIG. 8b is a perspective view of a section of sheet folded multiple times.
Figure 9:
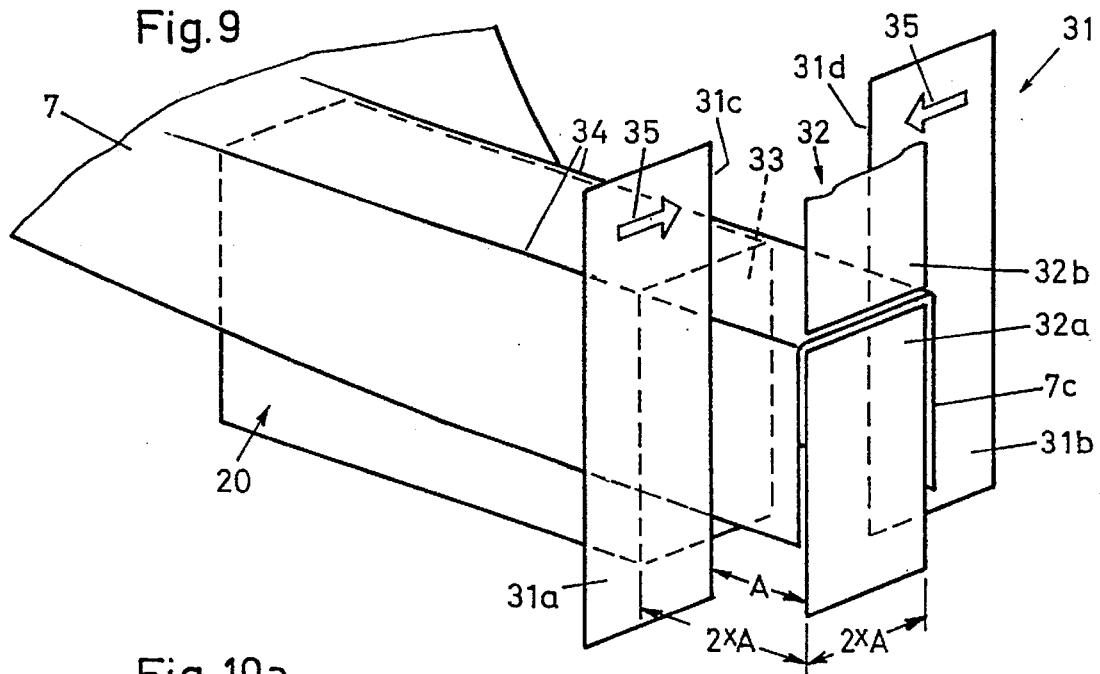
FIG. 9 is a perspective view of a schematic drawing of another variation of the device according to the invention.
Figure 15A:
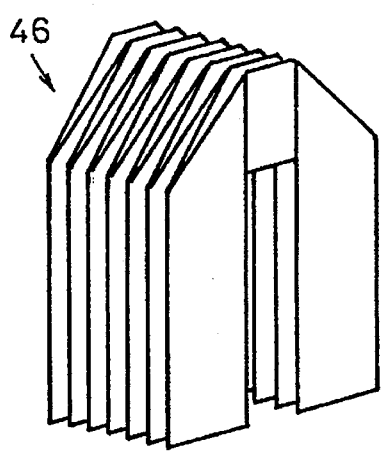
FIG. 15a is a perspective view of a sheet folded with a device according to the FIGS. 5 to 8.
Figure 15B:
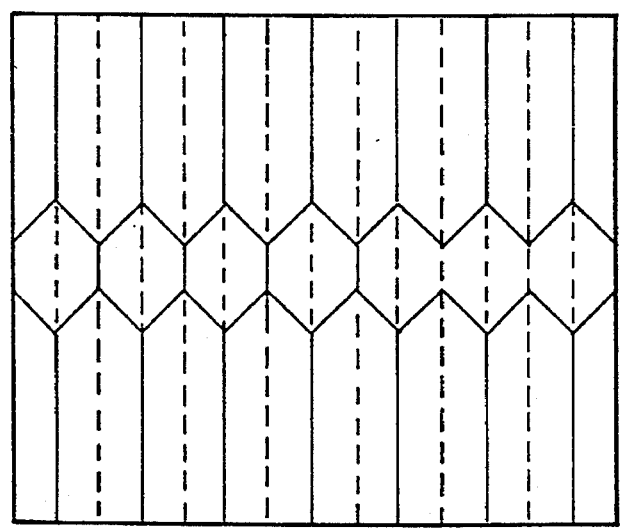

FIGS. 5 to 8b depict a device and a process according to a variation. The major distinction between this device and the aforementioned device is that there is a guide element 20, in which opposing guide surfaces 20a and 20b exhibit a distance B. The guide element 20 also exhibits a recess 22, which matches the recess 3. The device also exhibits clamping elements 15 and 16, which, apart from a suitably larger distance between the slides 15a and 15b or 16a and 16b, perform the same movements as explained above. The sheet 7 is laid over the guide element 20 in the longitudinal direction, thus forming two first folds 28 in the sheet 7 in accordance with two guide edges 21. FIGS. 6 and 7a depict the sequence of a first folding operation, which is also repeated here continuously for the purpose of forming other folds. FIG. 7b depicts a sheet 7, in which a first fold has been formed. As evident, this fold differs from that according to FIG. 3b in that it is shaped like a U, as seen in the longitudinal direction of the sheet. The distance between the parallel outer edges 7d is 2A+B, where A denotes the width of a fanfold and B the distance between the guide surfaces 20a and 20b. As FIG. 5 shows, the distance between the clamping elements 15 and 16 in the normal position equals 2A. The height of the recess 22 is at least A. Through a suitable choice of the distances A and B, it is quite possible with the device of the invention to modify the dimensions of the folds. FIG. 15a depicts a layer folded with this device. FIG. 15b depicts the protective layer 46 in the unfolded state.

FIGS. 9 to 13 illustrate a third variation of the device according to the invention. It, too, exhibits an oblong guide element 30 and two clamping elements 31 and 32. In this device according to FIG. 9, the sheet 7 is also laid over the guide element 30 in the longitudinal direction and exhibits two parallel first folds 34 that are space apart. A first clamping element 31 exhibits two sliders 31a and 31b, which are arranged laterally next to the guide element 30, but in front of a front-sided face 33 of the guide element 30. The sliders 31a and 31b are provided with a drive (not illustrated here), with which these sliders can be moved head on against each other and back into the starting position. Front straight edges 31c and 31d are always parallel to each other. The second clamping element 32 exhibits two sliders 32a and 32b, which are also provided with a drive and can be moved in the longitudinal direction of the guide element 30. These movements are indicated with the arrows 36 in the FIGS. 11a, 11b and 13. The sliders 32a and 32b can also be moved vertically (arrows 39 in FIG. 12a). The sliders 31a and 31b can also be moved in the longitudinal direction of the guide element 30. In the following the formation of a first fold is explained briefly with reference to FIGS. 9 to 13 FIG.

Figure 10A:
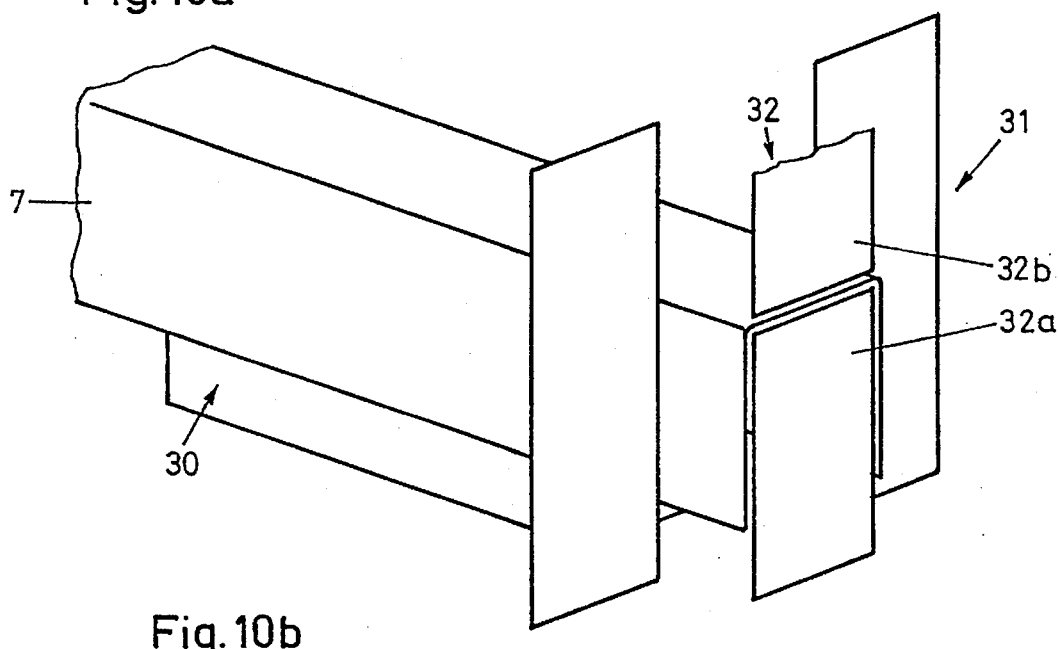
FIG. 10a depicts the device according to FIG. 9, immediately prior to the formation of a first fold.
Figure 10B:
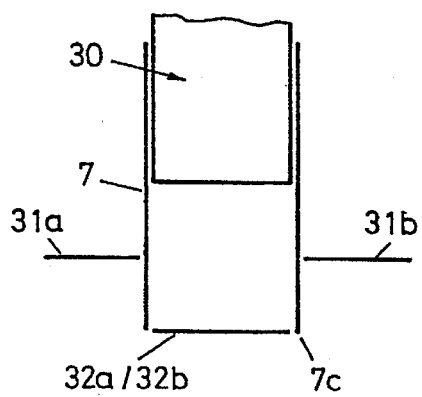
Figure 11A:
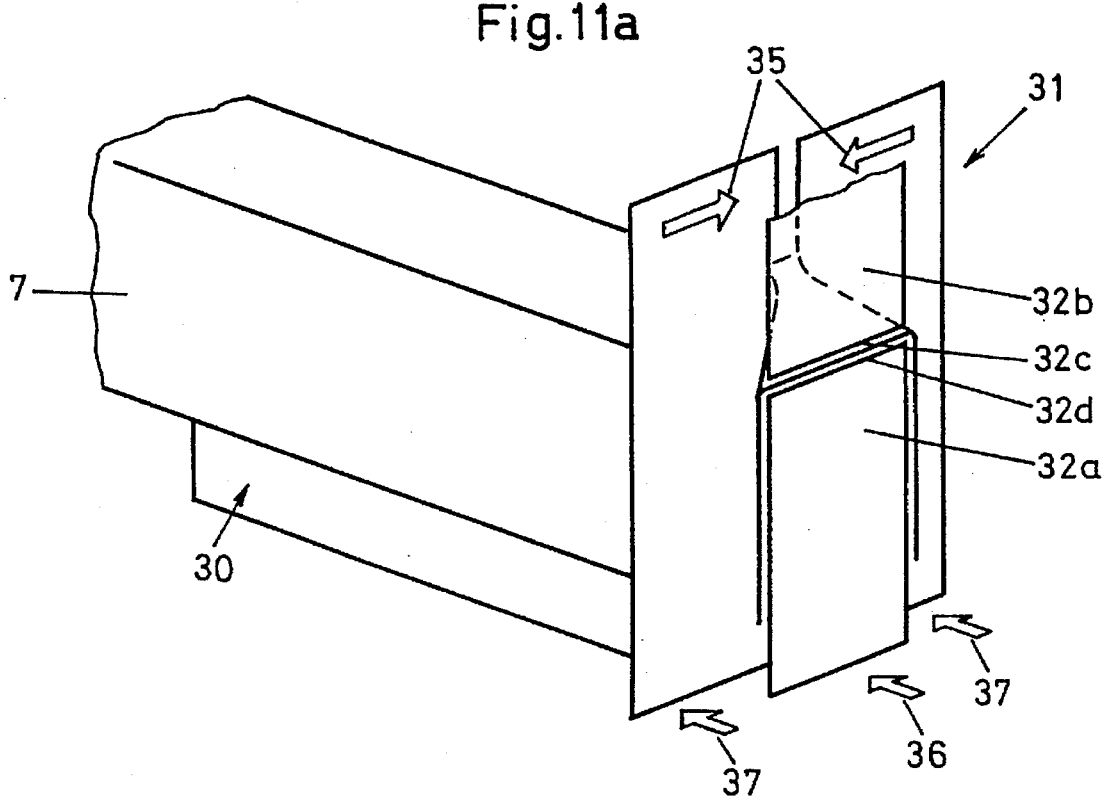
FIG. 11a depicts the device according to FIG. 9 during the formation of a first fold.
Figure 11B:
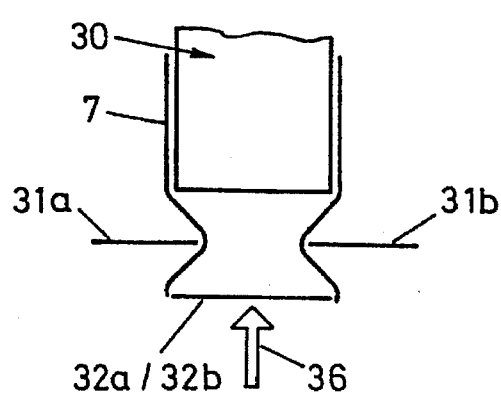
Figure 11C:
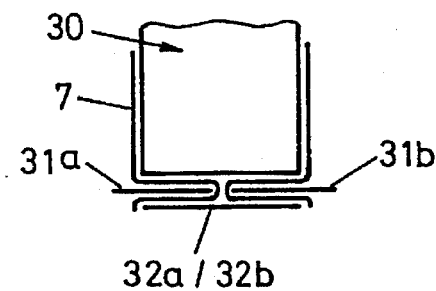
FIG. 11c is a top view of the device according to FIG. 9, immediately following the formation of a first fold.
Figure 12A:
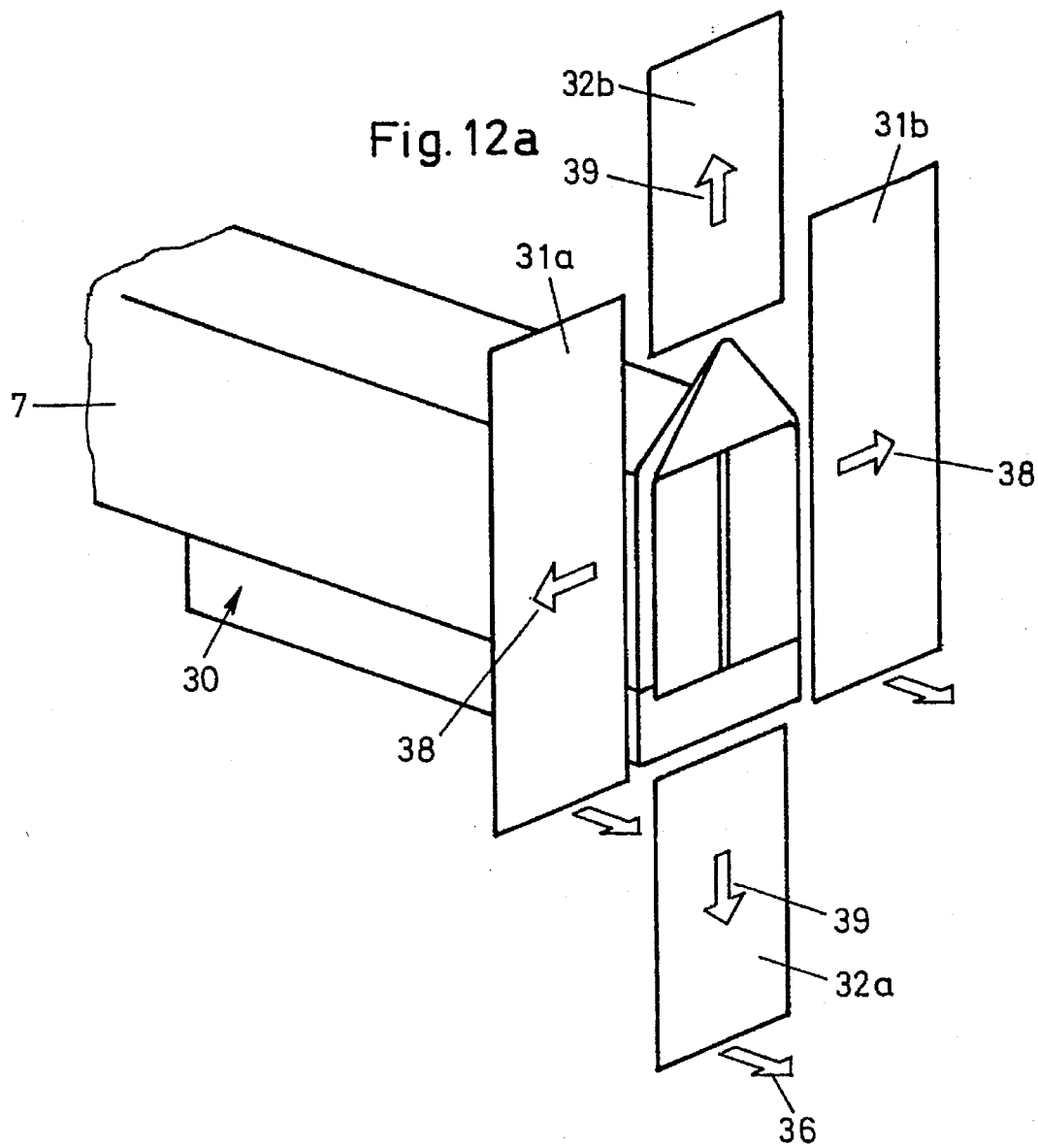
FIG. 12a is a top view of the device according to FIG. 9, following the formation of a first fold.
Figure 12B:
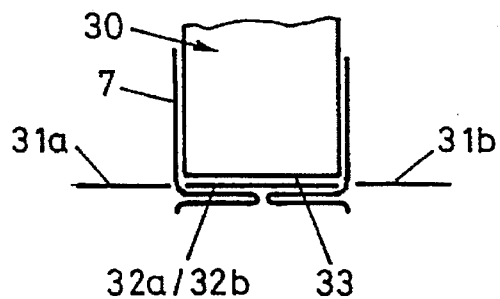
Figure 13:
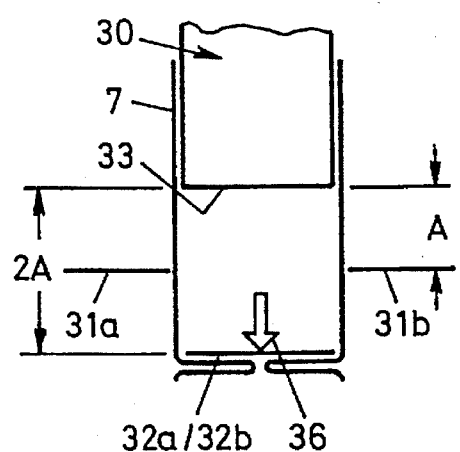
FIG. 13 is a top view of the device according to FIG. 9, in a position prior to the formation of a second fold.
Figure 14B:
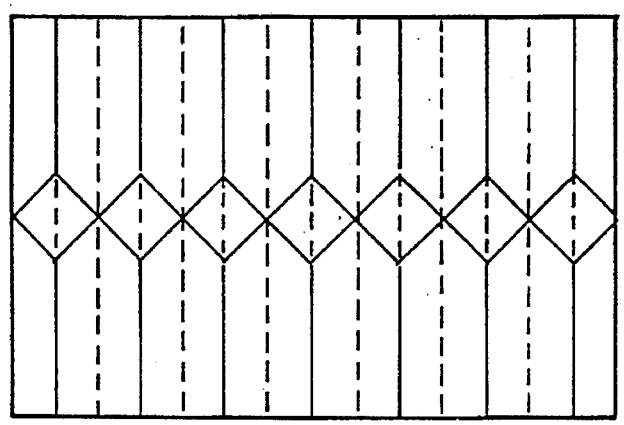
Figure 16A:
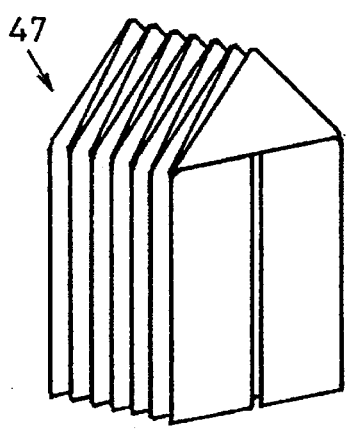
FIG. 16a is a view of a protective layer produced with a device according to the FIGS. 9 to 13.
Figure 16B:
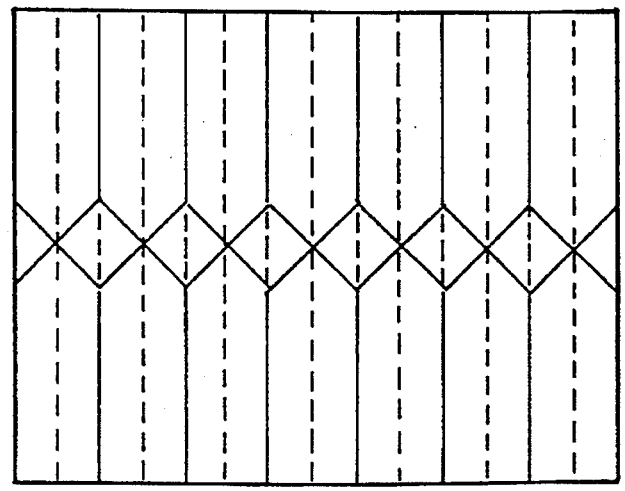

9 shows the starting position, in which the sheet 7 is slid on the guide element 30 until the front edge 7c is directly in front of the sliders 32a and 32b, as apparent in particular from FIG. 10b. At this stage the two sliders 31a and 31b are moved in the direction of the arrows 37 at right angles to the guide element 30; and at the same time these two sliders are moved in the direction of the arrows 37 in the longitudinal direction of the guide element 30 toward the front-sided face 33. FIGS. 11b and 11c illustrate these movements. At the same time the sliders 32a and 32b clamp rigidly the sheet 7 and, in so doing, move in the longitudinal direction of the guide element 30 toward the face 33. These movements result finally in the arrangement shown in FIGS. 11a and 11c. The clamping edges 31c and 31d, 32c and 32d are forced together and the sliders 32a and 32b rest against the two sliders 31a and 31b in the longitudinal direction of the guide element 30. In this position a first fold of the sheet 7 is formed. At this stage the two sliders 31a and 31b are moved apart in the direction of the arrows 38; and, according to FIG. 12a, the sliders 32a and 32b are pulled out of the fold that is formed towards the top or toward the bottom in the direction of the arrows 39. Now the sheet 7 is slid further along the guide element 30. The freshly formed fold distances itself from the front-sided face 33. To maintain the starting position for the second folding operation, the sliders 32a and 32b are slid behind the formed fold in the opposite direction of the arrows 39 toward the top or toward the bottom. Thus, the sliders 32a and 32b are directly in front of the face 33 (FIG. 12b). At this stage the sliders 32a and 32b are moved away from the face 33 by the length 2A; and at the same time the sliders 31a and 31b are also moved away from the face 33 by the length A. The four sliders have now assumed again the starting position shown in FIG. 9. As shown in FIG. 13, the first fold is now in front of the sliders 32a and 32b; and the two sliders 31a and 31b are arranged between the slider 32a and the face 33. To form the second fold, the aforementioned movements are repeated. The sheet 7 is now folded with the respectively repeated cycles until the sheet 47 is folded as shown in FIG. 16a. The unfolded sheet 47 is shown in the FIG. 16b. If the FIGS. 14a, 15a and 16a are compared, it becomes immediately clear that the front view of the first folding operation is different in all three designs. With the device of the invention, several different kinds of folding operations are possible. FIGS. 14a and 14b show similar folding operations. Here only the sequences of the folds vary. Usually a wrapping is affixed to the sheets 45 to 47, illustrated in FIGS. 14a, 15a, and 16a, for which purpose another suitable device can serve. However, these wrappers can also be affixed by hand.

I claim:

1. A device for forming a folded protective layer for toilet seats, said device comprising:

a guide element with at least one edge, wherein an oblong sheet which is used to form the protective layer is folded around said at least one edge substantially parallel to a longitudinal axis of said oblong sheet and slidably supported on said at least one edge of said guide element; and clamping elements arranged on sides of said guide element, wherein said clamping elements are movable in a direction substantially transverse to a longitudinal axis of said guide element in order to grasp said oblong sheet between respective clamping elements said guide element, and wherein said clamping elements are then further movable in first or second directions parallel to the longitudinal axis of the guide element in order to form folds in the sheet on the sides of the guide element, and wherein said guide element has two substantially flat guide surfaces which are opposite each other, said sheet being slid along said flat guide surfaces in a direction parallel to the longitudinal axis of the guide element.

2. The device as claimed in claim 1, comprising two clamping elements that are spaced apart along the longitudinal axis of the guide element, wherein a front-sided one of said clamping elements is movable in a direction substantially transverse to the longitudinal axis of the guide element, and the other one of said clamping elements is movable in the direction substantially transverse to the longitudinal axis of the guide element and along the longitudinal axis of the guide element.

3. The device as claimed in claim 1, wherein the clamping elements each comprise two sliders, and each of said sliders comprises a front clamping edge.

4. The device as claimed in claim 2, wherein the guide element has a recess in a region of the front-sided one of said clamping elements for receiving a cross fold.

5. The device as claimed in claim 1, further comprising means for moving the sheet away from the guide element during a folding operation, said means being disposed between the clamping elements.

6. The device as claimed in claim 5, wherein said means for moving the sheet away from the guide element comprises a blowing device (6) for blowing air against an open side of the sheet during the folding operation.

7. The device as claimed in claim 6, wherein said guide element includes a recess disposed between the clamping elements said blowing device being disposed so as to direct air toward the recess.

8. The device as claimed in claim 1, wherein said guide element comprises parallel edges that are spaced apart, and wherein the sheet is folded over said parallel edges.

9. The device as claimed in claim 1, wherein a clamping element is disposed in front of a front side face of said guide element and wherein another clamping element that can be moved against said front side face is arranged at a predetermined distance away from said front side.

10. The device as claimed in claim 9, wherein said another clamping element comprises two sliders said two sliders being disposed for movement in a first direction toward said front side face of said guide element and in a second direction substantially transverse to said first direction and away from said front side face.

* * * * *